United States Patent [19]
Cherek et al.

[11] Patent Number: 5,748,562
[45] Date of Patent: May 5, 1998

[54] LEVEL DETECTOR FOR SOLIDS

[75] Inventors: Bogdan Cherek; Jean-Pierre Pawliw, both of Peterborough, Canada

[73] Assignee: Milltronics Ltd., Peterborough, Canada

[21] Appl. No.: 841,991

[22] Filed: Apr. 8, 1997

[51] Int. Cl.⁶ .................................................. G01S 15/08
[52] U.S. Cl. ............................................. 367/124; 367/908
[58] Field of Search ................................. 367/118, 124, 367/908; 23/290 V; 340/621, 612

[56] References Cited

U.S. PATENT DOCUMENTS

| | | | |
|---|---|---|---|
| 4,325,255 | 4/1982 | Howard et al. | 73/290 V |
| 4,540,981 | 9/1985 | Lapetina | 340/621 |
| 4,821,215 | 4/1989 | Woodward | 364/550 |
| 4,831,565 | 5/1989 | Woodward | 367/99 |

FOREIGN PATENT DOCUMENTS

| | | | |
|---|---|---|---|
| 262990 | 4/1988 | European Pat. Off. | |
| 2150292 | 6/1985 | United Kingdom | |

*Primary Examiner*—Daniel T. Pihulic
*Attorney, Agent, or Firm*—Ridout & Maybee

[57] ABSTRACT

A vibrating probe for detecting a threshold level of solids within a vessel consists of an ultrasonic acoustic transducer assembly having a resonant frequency, the assembly being supported within the vessel and including a coupling member to couple the transducer acoustically to the solids at the threshold level, a transmitter for generating repeated bursts of high-frequency electrical energy and applying them to the transducer, the bursts being of sufficient amplitude to render the assembly self cleaning of adherent solids, a circuit for measuring the amplitude of ringing of the transducer after cessation of each burst, and a circuit for comparing the amplitude of such ringing at a predetermined interval after a burst with predetermined threshold level. Both the predetermined interval and the threshold level may be selectable.

3 Claims, 1 Drawing Sheet

LEVEL DETECTOR FOR SOLIDS

FIELD OF THE INVENTION

This invention relates to level detectors for solids of the type in which a vibrating probe is located within a vessel such that when the level of solids in the vessel rises to submerge the probe, the vibratory behaviour of the probe is modified in a detectable manner, thus signalling that a threshold solids level has been reached.

BACKGROUND OF THE INVENTION

Numerous such detectors have been developed of which DE 4203967 A1 (Endress & Hauser) is but an example, but because of the widely varying characteristics of solids to be detected, none has proved entirely satisfactory under all circumstances. Some designs employ forked probes, which can fail to function properly if lumps of the solid to be detected become stuck in the fork. Others, using concentric or single probes, can fail to function reliably if adherent solids or dust or other deposits from the solids build up excessively on the probe assembly. The vibration of the probe can in some cases cause a cavity to form in the solids around the probe, thus giving a false indication. Careful design is necessary to prevent vibration from the probe being coupled excessively and unpredictably through the walls of the vessel in which the probe is mounted, possibly giving rise to unreliable operation.

In U.S. Pat. No. 4,831,565 (Woodward), assigned to the present applicant, it is disclosed that in an acoustic pulse-echo ranging system, the amplitude of ringing of an acoustic transducer may be sampled a predetermined time after application of a burst of high-frequency electrical energy to the transducer and compared with a threshold value in order to determine whether the transducer is present and operative. In U.S. Pat. No. 4,540,981 (Lapetina), a somewhat similar principle is utilized to determining whether a probe or diaphragm is submerged in liquid. The probe is located within a pipe into which the liquid flows, and is excited from outside of the container being monitored. The ringing of the probe or diaphragm is more heavily damped in the presence of liquid, and this can be detected.

When solids are being sensed, changes in damping applied to a vibratory member may be less marked, depending on the nature of the solid, and thus more difficult to detect.

SUMMARY OF THE INVENTION

It is an object of the present invention to provide a level detector of the type discussed above which addresses problems encountered with such detectors, and which can provide reliable operation in a range of solids.

According to the invention, there is provided a vibrating probe for detecting a threshold level of solids within a vessel, comprising an ultrasonic acoustic transducer assembly having a resonant frequency, the assembly being supported within the vessel and including a coupling member adapted to couple the transducer acoustically to the solids at the threshold level, a transmitter for generating repeated bursts of high-frequency electrical energy and applying them to the transducer, the bursts being of sufficient amplitude to render the assembly self cleaning of adherent solids, means for measuring the amplitude of ringing of the transducer after cessation of each burst, and means for comparing the amplitude of such ringing at a predetermined interval after a burst with a predetermined threshold level. Both the predetermined interval and the threshold level may be selectable.

In a preferred arrangement, the frequency of the energy applied to the transducer assembly is at the frequency of a resonance which the assembly can sustain in free air but not when the coupling means is contact with a solid.

SHORT DESCRIPTION OF THE DRAWINGS

FIG. 1 is a vertical section through an example of a suitable acoustic transducer and coupling member for use in implementing the invention; and FIG. 2 is a schematic block diagram of an electronic circuit utilized in conjunction with the transducer.

DESCRIPTION OF THE PREFERRED EMBODIMENT

Figure 1:
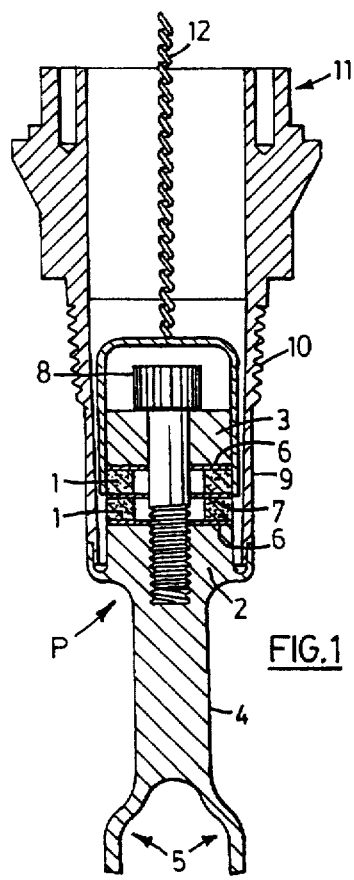

A piezoelectric transducer assembly will typically have a number of possible modes of vibration. The assembly P of FIG. 1 is designed so that its lowest frequency mode of operation can only occur when the device is suspended in a gaseous environment. The device P of FIG. 1 consists of a piezoelectric elements 1, typically disks of piezoelectric material such as lead zirconate (PZT), sandwiched between contact disks 6 and 7 and clamped between loading blocks 2 and 3 by means of a screw 8 threaded into the block 2 and pressing the blocks 2 and 3 against the piezoelectric elements 1 through the contact washers 6 and 7. A column 4 extends vertically downward below the block 3 to a coupling member 5, which is of sufficiently restricted dimensions that it provides little coupling between the device and ambient air, but is of sufficient area and such a configuration, for example a fork as shown, that substantial coupling will occur between the members and a particulate solid as the latter contacts the member. The fork is tuned to have a fundamental frequency equal to the resonance frequency of the transducer assembly in free air since this enhances ringing of the assembly in free air. Typically the elements of the device may be chosen and dimensioned so that the assembly will have a lowest frequency mode series resonance in air in the range 20 to 50 kHz, for example 27 kHz.

The piezoelectric device need not have the structure shown, but must be such that contact of a coupling member with a solid whose level is being monitored will substantially reduce the Q or quality factor of the assembly and thus tend to suppress or greatly reduce the amplitude of ringing of the assembly. With the arrangement shown, contact with particulate solids will tend to result in supervision of the fundamental resonance of the fork and replacement of a vibration antinode at or near the fork 5 by a node at or near that location. Since this would force a change to a higher mode of vibration under which the conditions for sustained ringing at the frequency of excitation can no longer be satisfied, the Q of the assembly will drop dramatically. The fork 5 may be replaced by other forms of element providing effective coupling to the solids being monitored, but its use helps accentuate the results of the mode change caused by contact with solids. The high amplitude of the high frequency pulses applied to the assembly renders the fork self cleaning and minimizes the risk of material lodging on or in it. Different piezoelectric device structures could be utilized, provided that contact of solids with a lowest point thereof can be relied upon to cause a mode change by suppressing a free-air resonance occurring at the excitation frequency applied, thus resulting in a dramatic decrease of the Q of the assembly.

The terminals 6 and 7 are connected to a cable 12, and the assembly is supported through a thin-walled tubular housing 9 which may be provided with alternative mountings 10 and 11.

Figure 2:
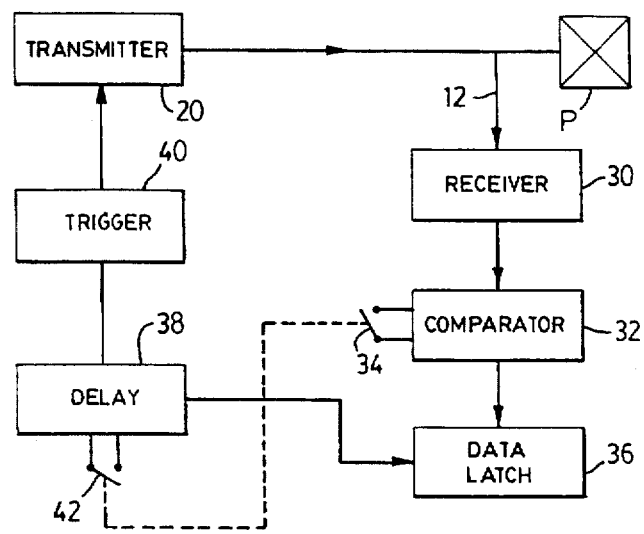

Referring now to FIG. 2, the terminals 6 and 7 of transducer P are connected by the cable 12 both to a transmitter 20 and to a receiver 30. The transmitter and receiver are similar to those conventionally used in ultrasonic pulse-echo ranging equipment. Thus the transmitter can be triggered to generate high amplitude bursts or shots of high frequency electrical energy which are applied to the transmitter through the cable 12. Typically these bursts, for application to a piezoelectric transducer such as that described above, may have a peak-to-peak potential of about 250 volts and a duration of 1 millisecond. The frequency of the bursts is the same as that of the selected resonant frequency of the transducer, in this example about 27 kHz, although a small frequency offset may be applied to tailor the ringing characteristics of the transducer in free air to a desired profile. The pulse amplitude should be high enough to ensure that the column 4 and coupling member 5 are self-cleaning under anticipated conditions of operation, and the transducer must accordingly be designed to handle such pulses without damage.

The receiver includes an input circuit, typically consisting of a high value resistor and clipping diodes, designed to protect the receiver circuit from the high amplitude bursts from the amplifier, and an impedance matching preamplifier applying signals from the cable 12 to an envelope detector. Following the end of each transmitter burst, the signal in the cable will represent ringing of the transducer assembly, which in free air has a high Q or quality factor. The output of the receiver thus includes a portion following cessation of each burst which represents the amplitude of ringing of the transmitter. The signal is applied to a comparator 32, in which its amplitude is compared to a reference amplitude which may be selectable by a switch 34.

The output of comparator 32 indicates whether the ringing amplitude is above or below the selected reference level, this output being sampled and stored by a data latch 36 at an interval after cessation of a burst which is set by a delay circuit 38 triggered by a trigger circuit 40 which also triggers the generation of bursts by the transmitter. The delay imposed by the delay circuit is greater than the duration of the burst, so that the sampling of the envelope occurs a predetermined interval after cessation of each burst. This predetermined interval may be selectable by means of a switch 42, which may be gauged with the switch 34 so as to select between a smaller interval, and a higher threshold or a greater interval and a lower threshold, since it is found that the latter approach provides more reliable results with low density solids. The trigger circuit triggers pulses at intervals which are at least longer than the longest interval selectable by the switch 42, and may be dependent on how often readings are required from the system. Typically, ten bursts per second may be used but this is in no way critical.

When the assembly P is suspended from the housing 9 in a vessel containing a particulate solid, and the surface of the solid contacts the fork 5, the vibration of the fork and vibration antinode at or near the fork will tend to be suppressed because of interaction with the solid particles, thus limiting or destroying the ability of the assembly to sustain vibration at its lowest resonant frequency in free air. As a result, such vibration will become very heavily damped, dramatically lowering the Q of the assembly, although the extent of this effect will depend on the nature and density of the solids, and the suppression of ringing will be less rapid with light, feathery solids. This can be accommodated by using the switches 34 and 42.

The amplitude of the bursts applied to the transducer assembly is as indicated above made high enough that the latter is self-cleaning, thus preventing any build up of solids on the assembly.

We claim:

1. A vibratory probe for detecting a threshold level of solids within a vessel, comprising an ultrasonic acoustic transducer assembly having a resonant frequency, the assembly being supported within the vessel and including a coupling member adapted to couple the transducer acoustically to the solids at the threshold level, a transmitter for generating repeated bursts of high-frequency electrical energy and applying them to the transducer, the bursts being of sufficient amplitude to render the assembly self cleaning of adherent solids, a receiver coupled to the transducer for measuring the amplitude of ringing of the transducer after cessation of each burst, and a comparator comparing the amplitude of such ringing at a predetermined interval after a burst with a predetermined threshold level.

2. A vibratory probe according to claim 1, wherein the at least one of the predetermined interval and the predetermined threshold level is selectable.

3. A vibratory probe according to claim 1, wherein the frequency of the energy applied to the transducer assembly is at the frequency of a resonance which the assembly can sustain in free air but not when the coupling means is contact with a solid.

\* \* \* \* \*